United States Patent
Namera et al.

(10) Patent No.: US 7,580,581 B2
(45) Date of Patent: Aug. 25, 2009

(54) IMAGE DATA PROCESSING CIRCUIT AND IMAGE PROCESSING APPARATUS INCLUDING TRANSFER CONTROL SECTION FOR SELECTIVE OPERATION OF TRANSFER SECTION

(75) Inventors: Akihiro Namera, Nara (JP); Satoshi Morimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 721 days.

(21) Appl. No.: 11/187,288

(22) Filed: Jul. 22, 2005

(65) Prior Publication Data

US 2006/0023955 A1 Feb. 2, 2006

(30) Foreign Application Priority Data

Jul. 30, 2004 (JP) ............................. 2004-224420

(51) Int. Cl.
- *G06K 9/36* (2006.01)
- *G06K 9/54* (2006.01)
- *G06K 15/00* (2006.01)
- *H04N 1/46* (2006.01)
- *G06F 13/00* (2006.01)
- *G06F 13/28* (2006.01)

(52) U.S. Cl. ............... 382/232; 382/233; 382/276; 382/304; 382/305; 358/1.16; 358/1.17; 358/505; 358/501; 711/100

(58) Field of Classification Search ................ 382/232, 382/233, 276, 304, 305, 239; 358/1.15–1.17, 358/501, 505, 434, 523, 474, 426.03, 426.04, 358/426.05; 711/100; 375/E7.103, E7.226

See application file for complete search history.

(56) References Cited

U.S. PATENT DOCUMENTS

| | | | |
|---|---|---|---|
| 5,237,460 A * | 8/1993 | Miller et al. | 360/8 |
| 6,854,045 B2 * | 2/2005 | Ooi et al. | 711/202 |
| 7,072,060 B2 * | 7/2006 | Ohara | 358/1.15 |
| 7,162,583 B2 * | 1/2007 | Adl-Tabatabai et al. | 711/118 |

(Continued)

FOREIGN PATENT DOCUMENTS

| | | |
|---|---|---|
| JP | 03-009654 | 1/1991 |
| JP | 11-041429 | 2/1999 |
| JP | 2004-289556 | 10/2004 |

*Primary Examiner*—Andrew W Johns
*Assistant Examiner*—Mia M Thomas
(74) *Attorney, Agent, or Firm*—Renner, Otto, Boisselle & Sklar, LLP

(57) ABSTRACT

An image data processing circuit including: an input section for inputting image data; a plurality of compressing sections which are capable of compressing the input image data solely or in parallel; a plurality of decompressing sections which are capable of decompressing the compressed image data solely or in parallel; an output section for outputting the decompressed image data; a transferring section for transferring image data between a memory and of the input section, the compressing sections, the decompressing sections and the output section individually; and a transfer controlling section for selecting a mode from a parallel input/output mode, a parallel input mode and a parallel output mode.

1 Claim, 6 Drawing Sheets

U.S. PATENT DOCUMENTS

| | | | |
|---|---|---|---|
| 7,167,263 B2 * | 1/2007 | Takayama et al. | 358/1.15 |
| 7,362,471 B2 * | 4/2008 | Date | 358/2.1 |
| 7,447,365 B2 * | 11/2008 | Ferlitsch | 382/232 |
| 7,535,592 B2 * | 5/2009 | Niitsuma | 358/1.16 |
| 2003/0074515 A1 * | 4/2003 | Resnick | 710/313 |
| 2004/0098545 A1 * | 5/2004 | Pline et al. | 711/154 |
| 2004/0250011 A1 * | 12/2004 | Chen et al. | 711/103 |
| 2005/0169538 A1 * | 8/2005 | Moskvitin | 382/232 |
| 2005/0180643 A1 * | 8/2005 | Okada | 382/232 |
| 2007/0172134 A1 * | 7/2007 | Namera | 382/232 |

* cited by examiner

IMAGE DATA PROCESSING CIRCUIT AND IMAGE PROCESSING APPARATUS INCLUDING TRANSFER CONTROL SECTION FOR SELECTIVE OPERATION OF TRANSFER SECTION

CROSS-REFERENCE TO RELATED APPLICATION

This application is related to Japanese Patent Application No. 2004-224420 filed on Jul. 30, 2004, whose priority is claimed and the disclosure of which is incorporated by reference in its entirety.

BACKGROUND OF THE INVENTION

1. Field of the Invention

The present invention relates to image data processing circuits and image processing apparatus including the same.

2. Description of the Related Art

There have been known digital multifunction peripherals (also referred to as MFPs) configured to compress image data which has been obtained by scanning documents when storing the image data in a storage device and decompress and decode the compressed data into image data when printing the stored image data. The compression and decompression processes for image data are required to have processing capacities consistent with the scanning speed and the printing speed of the digital multifunction peripheral and, in many cases, these processes are performed using dedicated compression circuits and decompression circuits. However, so-called high-speed digital multifunction peripherals (hereinafter, referred to as high-speed machines) have high scanning speeds and high printing speeds and, in some cases, a single compression circuit and a single decompression circuit can not offer compression and decompression processes which follow the inputting and outputting rates. In such cases, there may be utilized a method which provides plural compression circuits and plural decompression circuits and causes image data to be divided and input to the respective compression and decompression circuits enabling parallel processes. As described above, there is known a method which provides plural compression and decompression circuits which are arranged in parallel and thus enables selecting combinations of these circuits in accordance with the input and output image data for increasing the overall efficiency of the compression and decompression processes (refer to Japanese Unexamined Patent Application No. Hei 11 (1999)-41429).

As previously described, digital multifunction peripherals include high-speed machines and other machines (referred to as medium-speed machines, in contrast with high-speed machines). For high-speed machines, a single compression circuit and a single decompression circuit can not perform compression/decompression processes followable to the inputting/outputting speeds. The medium-speed machines do not require the compression and decompression circuits to have processing speeds as high as those for high-speed machines, thereby allowing a single compression circuit and a single decompression circuit to realize processes. Medium-speed machines allow a pair of compression/decompression circuits to compress scanned data and decompress to-be printed data while high-speed machines require plural compression and decompression circuits in order to offer image data processes which can follow the inputting and outputting. Further, the image data processing capacity is determined by the data transferring capacity for transferring image data obtained by scanning documents to the compression circuit and by the data transferring capacity for transferring image data decompressed by the decompression circuit to or from a memory. Image data transferred through the aforementioned portions is not compressed and thus has a large data quantity, which tends to restrict the processing capacity. This tends to restrict the processing capacity more significantly when the number of bits per pixel is increased, when the resolution is increased or when the inputting and outputting rates are increased for increasing the image quality.

In many cases, these image-compression/decompression circuits are realized using ASICs (or Application Specific ICs) in order to satisfy requirements in the performance and the cost. However, the compression and decompression circuits have large circuit scales and, if the compression and decompression circuits are configured to be arranged in parallel for high-speed machines, the ASIC will have surplus performance and involves a high cost, while if the ASIC is optimized for medium-speed machines, the ASIC will not satisfy the performance requirement of high-speed machines. However, in view of the cost and the number of developing processes, ASICs configured to be usable for both high-speed machines and medium-speed machines are preferable.

On the other hand, as the compression and decompression processes in the digital multifunction peripherals, there has been a need for other processes such as decompressing data which has been compressed and stored in a storage device, then performing image processing, compressing it again and then transmitting it to the outside through a network, etc., in addition to the compression of the aforementioned scanned data and the decompression of to-be printed data. Then, it is desirable that such processes are performed in parallel with the processes for scanned data and to-be printed data. In order to cope with such parallel processes, it is necessary that the compression/decompression circuits are arranged in parallel with one another such that the numbers of the compression/decompression circuits correspond to the number of required processes.

SUMMARY OF THE INVENTION

The present invention provides image data processing circuits including inputting and outputting circuits for image data, compression and decompression circuits and data transferring circuits for transferring image data between these circuits and a memory and capable of realizing a structure suitable for both medium-speed machines and high-speed machines and, in particular, provides image data processing circuits employing ASICs. Further, the present invention provides image data processing circuits configured to be capable of utilizing compression and decompression circuits, which are not assigned to scanned data processing and to-be printed data processing, for other processes.

The present invention provides an image data processing circuit comprising: an input section for inputting image data; a plurality of compressing sections including a first compressing section and a second compressing section which are capable of compressing the input image data solely or in parallel; a plurality of decompressing sections including a first decompressing section and a second decompressing section which are capable of decompressing the compressed image data solely or in parallel; an output section for outputting the decompressed image data; a transferring section for transferring image data between a memory and the input section, the compressing sections, the decompressing sections and the output section individually; and a transfer controlling section for selecting a mode from a parallel input/output mode, a parallel input mode and a parallel output mode, wherein the parallel input/output mode performs in parallel input transfer for transferring image data input from the input section to the memory and then from the memory to the first compressing section and output transfer for transferring data from the first decompressing section to the memory and then from the memory to the output section, the parallel input mode transfers input image data from the input section to the memory and then from the memory to the first compressing section and the second compressing section to compress the image data in parallel, and the parallel output mode transfers data decompressed in parallel by the first decompressing section and the second decompressing section to the memory and then from the memory to the output section.

The image data processing circuit according to the present invention includes the transfer controlling section for selecting any one of the parallel input/output mode in which the input transfer and the output transfer are performed in parallel, the parallel input mode in which input image data are compressed in parallel, and the parallel output mode in which data decompressed in parallel are transferred to the output section. This allows selecting a suitable structure in accordance with required compression/decompression processing speed and a required image data transferring speed, and thus the image data processing circuit of the present invention can be adapted to both high-speed machines and low-speed machines with a structure suitable for the respective machines. In other words, the image data processing circuit in the parallel input mode and the image data processing circuit in the parallel output mode are used in a pair for high-speed machines, while the image data processing circuit in the inputting/outputting parallel transfer mode can be used by itself for medium-speed machines. Thus, the structure of the circuit can be optimized depending on the application thereof. This eliminates the necessity of designing different circuits for high-speed machines and for medium-speed machines. Consequently, the number of developing processes and the cost can be saved, whereby low-price products can be provided in short developing terms.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
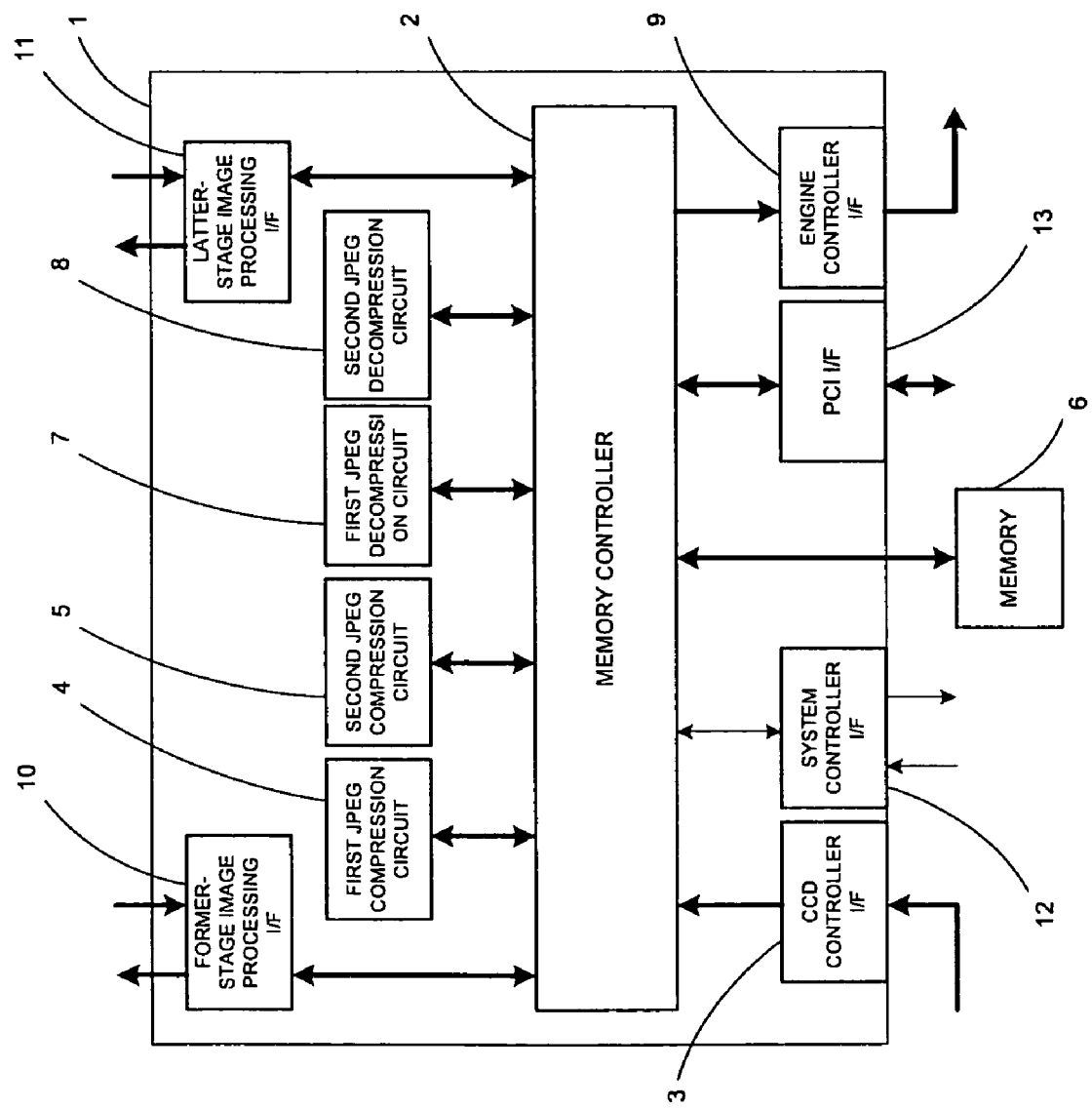
FIG. 1 is a block diagram illustrating an exemplary structure of an image data processing circuit according to the present invention.

An image data processing circuit according to the present invention includes: an input section for inputting image data; a plurality of compressing sections including a first compressing section and a second compressing section which are capable of compressing the input image data solely or in parallel; a plurality of decompressing sections including a first decompressing section and a second decompressing section which are capable of decompressing the compressed image data solely or in parallel; an output section for outputting the decompressed image data; a transferring section for transferring image data between a memory and the input section, the compressing sections, the decompressing sections and the output section individually; and a transfer controlling section for selecting a mode from a parallel input/output mode, a parallel input mode and a parallel output mode, wherein the parallel input/output mode performs in parallel input transfer for transferring image data input from the input section to the memory and then from the memory to the first compressing section and output transfer for transferring data from the first decompressing section to the memory and then from the memory to the output section, the parallel input mode transfers input image data from the input section to the memory and then from the memory to the first compressing section and the second compressing section to compress the image data in parallel, and the parallel output mode transfers data decompressed in parallel by the first decompressing section and the second decompressing section to the memory and then from the memory to the output section.

Here, "compressing image data in parallel" refers to transferring image data associated with different image regions to the first compressing section and the second compressing section in parallel and compressing the data in parallel to enable higher-speed compression processes in comparison with compression of entire image data by only the first or second compressing section. The same applies to the decompression.

The compression and decompression processes may be performed with well-known algorithms. For example, these processes may be performed with JPEG schemes, but they are not limited thereto.

Further, the present invention provides an image processing apparatus including: the above-mentioned image data processing circuit in which the parallel input/output mode is selected; a scanner section for scanning a document and inputting image data to the input section of the image data processing circuit; an image data storage section for storing image data compressed by the first compressing section and providing the image data to the first decompressing section when an image is to be output; the memory for receiving and transmitting image data from/to the input section, the first compressing section, the first decompressing section and the output section of the image data processing circuit, and the image data storage section; and a printing section for printing image data output from the output section of the image data processing circuit onto paper.

The image processing apparatus according to the present invention includes the image data processing circuit in which the parallel input/output mode is selected so that the image data compression process at the input side and the image data decompression process at the output side are performed in parallel, thereby realizing an image processing apparatus having a suitable structure for medium-speed machines.

Here, the aforementioned memory and the image data storage section may employ either different storage devices or the same storage device. The storage device realizing the aforementioned memory may be, for example, a DRAM. However, it is not limited thereto and may be any storage devices capable of storing image data. Also, it may be an SRAM or other storage devices. Further, the storage device realizing the image data storage section may be the aforementioned storage device, but is not limited thereto. Also, it may be a storage device such as a hard disk or a flash memory which are capable of retaining data even when the power is shutdown.

The scanner section may read images by moving documents or by moving the reading side or may read an entire image region of the documents without employing an operating section. The image reading device may be, for example, a CCD linear image sensor, but is not limited thereto. The image reading device may be an intimate-contact type image sensor, a CCD area image sensor or a pickup tube.

The printing section may be, for example, an electrophotographic printer, but is not limited thereto. The printing section may be any ink-jet type printer or electrostatic printer capable of outputting image data.

Also, an image processing apparatus according to the present invention includes: a first circuit including the aforementioned image data processing circuit in which the parallel input mode is selected; a second circuit including the aforementioned image data processing circuit in which the parallel output mode is selected; a scanner section for scanning an image on a document and inputting the image to the input section belonging to the first circuit; an image data storage section for storing image data compressed by the first and second compressing sections belonging to the first circuit and providing image data to the first and second decompressing sections belonging to the second circuit when an image is to be output; a first memory for receiving and transmitting image data from/to the input section, the first compressing section and the second compressing section of the first circuit and the image data storage section; a second memory for receiving and transmitting image data from/to the first decompressing section, the second decompressing section and the output section of the second circuit and the image data storage section; and a printing section for printing image data output from the output section belonging to the second circuit onto paper.

The image processing apparatus according to the present invention includes the first image data processing circuit in which the parallel input mode is selected and the second image processing circuit in which the parallel output mode is selected so that the first image data processing circuit is used to compress image data at the inputting side in parallel while the second image data processing circuit is used to decompress image data at the outputting side in parallel, thus realizing an image processing apparatus having a suitable structure for high-speed machines.

In the image processing apparatus, the transfer controlling section belonging to the first circuit may be configured to be capable of transferring image data decompressed by the first and/or second decompressing section to the first memory and then from the first memory to the output section during the parallel input mode operation, and the transfer controlling section belonging to the second circuit may be configured to be capable of transferring image data from the input section to the second memory and then from the second memory to the first and/or second compressing section during the parallel output mode operation.

By employing the above configuration in the structure of the image processing apparatus for high-speed machines, compressing sections or decompressing sections which are not used for the processing of image data transferred from the scanner section and for the processing of image data to be transferred to the printing section can be used to compress inputs from the image data section or decompress image data and then output it to the image output section. Accordingly, it is possible to realize a structure capable of effectively utilizing the respective sections of the image data processing circuit, for example, for processing data received from the outside through the network, then compressing the data and storing it in the image data storage section or for decompressing image data stored in the image data storage section, processing the image data and then transmitting it to the outside through the network.

Also, the image processing apparatus may be configured such that the output section belonging to the first circuit is connected to the input section belonging to the second circuit, the transfer controlling section belonging to the first circuit transfers image data from the first memory to the output section belonging to the first circuit and the transfer controlling section belonging to the second circuit transfers the transferred image data from the input section belonging to the second circuit to the second memory.

By employing the above configuration, image data which has been compressed or not compressed can be directly transferred from the first image data processing circuit to the second image data processing circuit, thus enabling directly transferring image data between the image data processing circuits without going through the image data storage section.

Hereinafter, embodiments of the present invention will be described on the basis of the appended drawings.

First Embodiment

In the present embodiment, there will be described exemplary structures of the image data processing circuit and the image processing apparatus according to the present invention. FIG. 1 is a block diagram illustrating an exemplary structure of the image data processing circuit according to the present invention. As illustrated in FIG. 1, the image data processing circuit 1 includes a CCD controller I/F 3 for inputting image data from a scanner section, a first JPEG compression circuit 4 and a second JPEG compression circuit 5 as compressing sections for compressing image data, a first JPEG decompression circuit 7 and a second JPEG compression circuit 8 as decompressing sections for decompressing image data, an engine controller I/F 9 for outputting image data to a printing section, a PCI I/F 13 for receiving and sending image data from and to external devices such as an HDD through a PCI bus, a former stage image processing I/F 10 and a latter stage image processing I/F 11 for receiving and sending image data from and to an image processing controller, a system controller I/F 12 for receiving and sending data from and to a system controller, and a memory controller 2 for controlling the transfers of image data between a memory 6 and the respective blocks and for processing the rotation of images, wherein the memory 6 functions as a work memory or a buffer memory during processes at the respective aforementioned blocks or inputting and outputting of data.

The JPEG compression circuits and the JPEG decompression circuits are circuits for compressing and decompressing image data using JPEG schemes. JPEG schemes are an aspect of compressing/decompressing schemes employed in the image data processing circuit according to the present invention. Further, the JPEG compression circuits and the JPEG decompression circuits may be realized using known circuits. The aforementioned image processing controller is a circuit for performing various types of filtering processes and color adjusting processes to image data. The system controller includes circuits for performing the bus control for CPU periphery, the control of a timer, the reception and transmission of controlling data for controlling the image data controller and the image processing controller, and the reception and transmission of image data from and to external devices connected to USBs or networks through the PCI bus.

The aforementioned memory controller 2 mainly controls the transfers of image data between the CCD controller I/F 3 and the memory 6, between the first JPEG compression circuit 4 or the second JPEG compression circuit 5 and the memory 6, between the first JPEG decompression circuit 7 or the second JPEG decompression circuit 8 and the memory 6, between the engine controller I/F 9 and the memory 6, between the former stage image processing I/F 10 and the memory 6, between the latter stage image processing I/F 11 and the memory 6, between the system controller I/F 2 and the memory 6, and between the PCI I/F 13 and the memory 6. More specifically, the memory controller 2 may be constituted by a DMA controller configured to be capable of making various types of settings for realizing the aforementioned image data transfers. The functions of the respective portions of the aforementioned image data controller 1 can be more clearly understood by understanding the structure of the image processing apparatus including the aforementioned image data controller 1.

Figure 2:
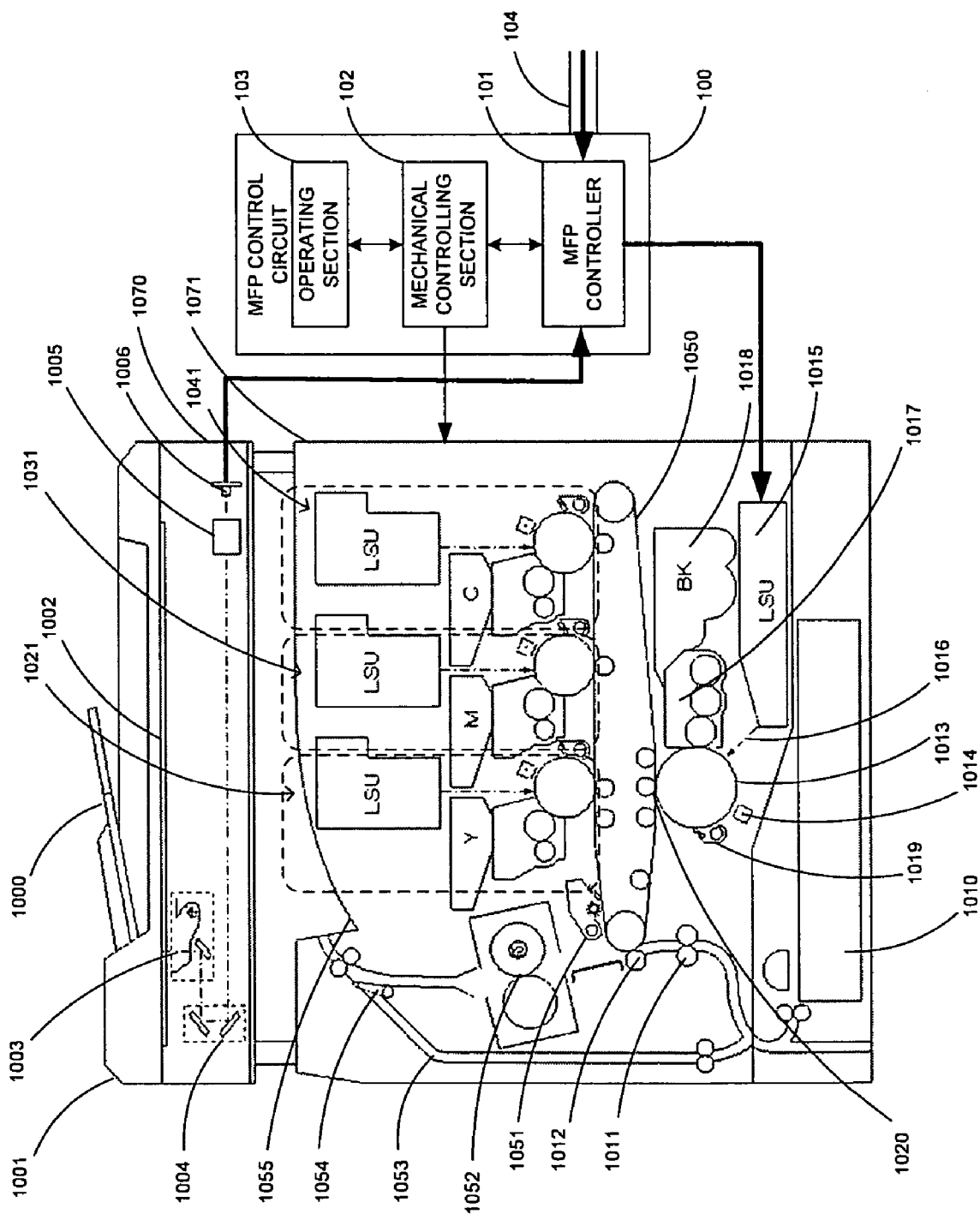
FIG. 2 is an explanation view illustrating an exemplary entire structure of an image processing apparatus according to the present invention, which includes the image data processing circuit of FIG. 1.
Figure 3:
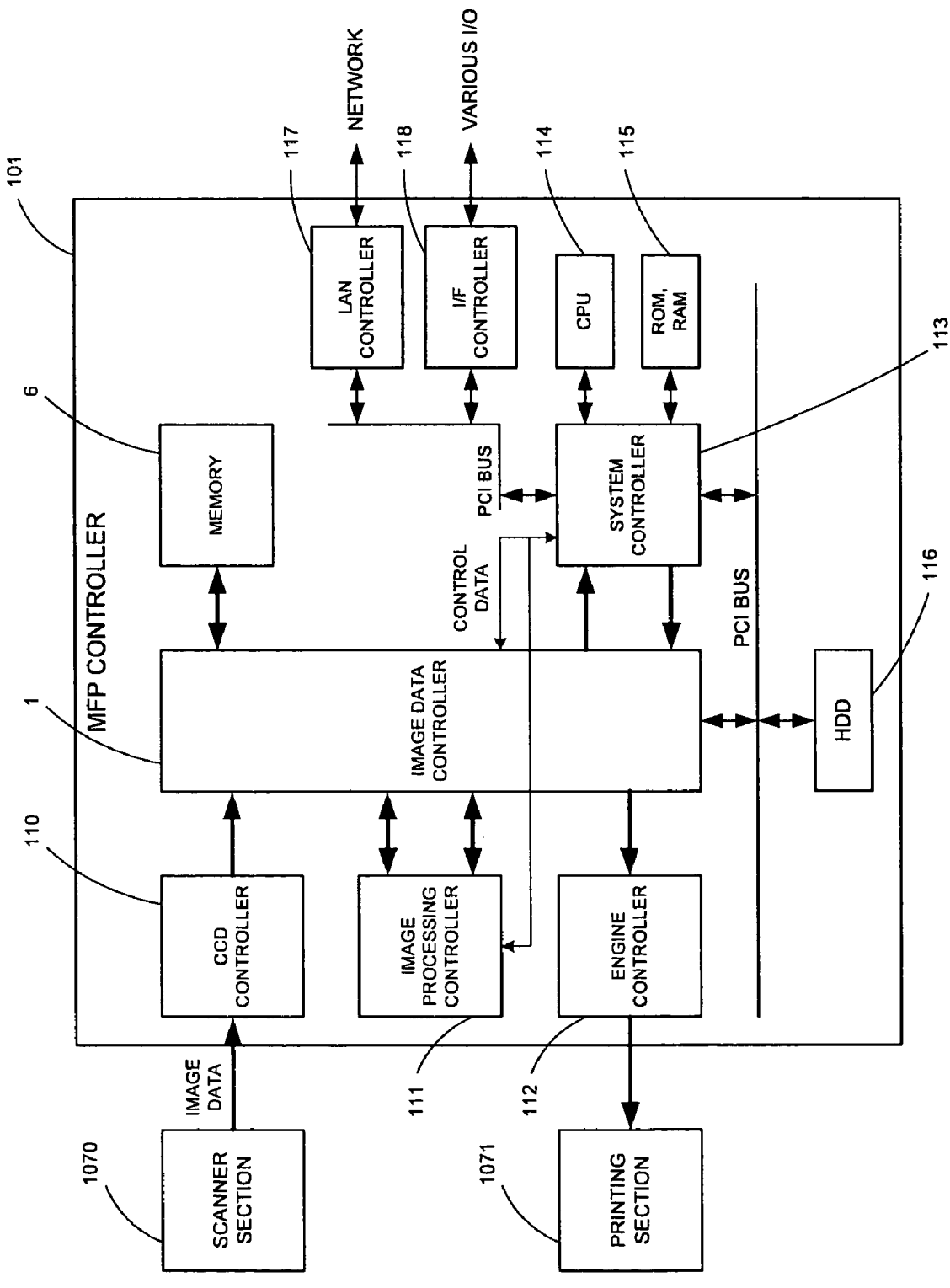
FIG. 3 is a block diagram illustrating in more detail the internal structure of the controller 101 of the image processing apparatus of FIG. 2.

FIG. 2 is an explanation view illustrating an exemplary entire structure of the image processing apparatus according to the present invention including the aforementioned image data processing circuit. Further, FIG. 3 is a block diagram illustrating in more detail the internal structure of a controller 101 of the image processing apparatus illustrated in FIG. 2. A document is placed on a light-exposing section 1002 in a scanner section 1070 illustrated in FIG. 2 and the to-be-read surface of the document is scanned by a first light-exposing scanning section 1003 and thus is exposed to the light thereof. Light reflected at the document is directed to an image sensor 1006 through a second light-exposing scanning section 1004 and an optical lens 1005. The image sensor 1006 converts a document image formed on the sensing surface thereof into electrical image data signals. Then, the image data is input to an MFP controller 101 as an image data processing circuit, within an MFP control circuit 100. The input image data is input to the image data controller 1 through a CCD controller 110 within the MFP controller 101 illustrated in FIG. 3. The CCD controller 110 controls a CCD which is the image sensor 1006 and transfers data from the CCD to the image data controller 1. The input image data is subjected to processes such as filtering or color adjustments, etc., in the image processing controller 111 as required, then compressed in the image data controller 1 and then stored in an HDD 116 which is an image data storage section. The stored image data is decompressed again in the image data controller 1, subjected to processes in the image processing controller 111 as required and then output to a printing section (printer) 1071 through an engine controller 112. The engine controller is a circuit for controlling the transfers of image data to a black laser-scanning unit (hereinafter, referred to as an LSU) 1015 and LSUs included in a yellow image-creating unit 1021, a magenta image-creating unit 1031 and a cyan image-creating unit 1041, which are included in the printing section 1071. There has been described an exemplary flow of image data in the MFP when it functions as a copier.

Further, for example, when the MFP functions as a network scanner, image data input from the scanner section 1070 is stored in the HDD 116 through the same path as the aforementioned path and the stored image data is transferred to a specified terminal on the network through the PCI bus and a LAN controller 117. On the other hand, when the MFP functions as a network printer, print data transferred from a terminal on the network is expanded by the system controller 113 through the LAN controller 117 and the PCI bus, stored in the HDD 116 as required and then transferred through the image data controller 1 and the engine controller 112 to the printing section 1071 where it is printed. Also, through an I/F controller 118, instead of the LAN controller 117, image data may be received and transmitted from and to an external device connected through a USB, for example. There have been described exemplary flows of image data in the MFP when it functions as a scanner and a printer.

In addition to the aforementioned image data flows, there is a function of temporally storing and accumulating, in the HDD 116, data input from the scanner section 1070 or the network and then outputting the data to the printing section 1071 or the network when a user requires to use it. Hereinafter, this function will be referred to as a document box function.

The MFP control circuit 100 illustrated in FIG. 2 includes a mechanical controlling section 102 for controlling the mechanism of the MFP and an operating section 103, in addition to the MFP controller. Each of the respective circuits may be constituted by a microcomputer, a ROM for storing programs to be executed by the microcomputer and backed-up data, a RAM for providing a work area for operations, and inputting/outputting circuits, etc. Further, the operating section 103 may include, for example, keys and a display device such as a liquid crystal display device or an LED display device.

The printing section 1071 illustrated in FIG. 2 is an example of an electrophotographic full color printer, which is an aspect of the printer engine. The signals of black print data processed by the MFP controller 101 are input to a laser device (not shown) within the LSU 1015. Laser light from the LSU 1015 is scanned over the surface of a photosensitive body 1013 to create an electrostatic latent image on the surface of the photosensitive body 1013. The created latent image is developed by a developing section 1017 and toner is adhered to the image regions. The toner adhered to the image regions on the photosensitive-body surface is transferred to a transferring belt 1050 at a first transferring section 1019. There has been described a black (K) print data hereinbefore. In the case of color data, the same image-creating process is performed for respective colors of yellow (Y), magenta (M), cyan (C) and toners are transferred to the transferring belt 1050. These processes are performed by the image-creating units 1021, 1031, 1041 placed within a rectangular shape drawn by a dot line in FIG. 2. The toners of the respective colors transferred to the transferring belt 1050 are transferred at a second transferring section 1012 to a paper fed from a paper tray 1010 and then fused by a fixing section 1052. At the portions on which the respective colors are laminated, the colors are mixed and fixed on the paper and the paper is output to a paper-output section 1055.

Second Embodiment

In the present embodiment, there will be described image data processes which are executed by the image data controller 1 in the image processing apparatus of FIG. 3. In the structure of FIG. 3, the CCD controller I/F 3 of the image data controller 1 is connected to the CCD controller 110 and image data from the scanner section 1070 is input thereto. Further, the engine controller I/F 9 is connected to the engine controller 112 and outputs image data to the printing section 1071. Further, the memory 6 is connected to the memory controller 2. The image processing controller 111 is connected to the former stage image processing I/F 10 and the latter stage image processing I/F 11. Further, the HDD 16 is connected to the PCI I/F 13 through a PCI bus.

Figure 5:
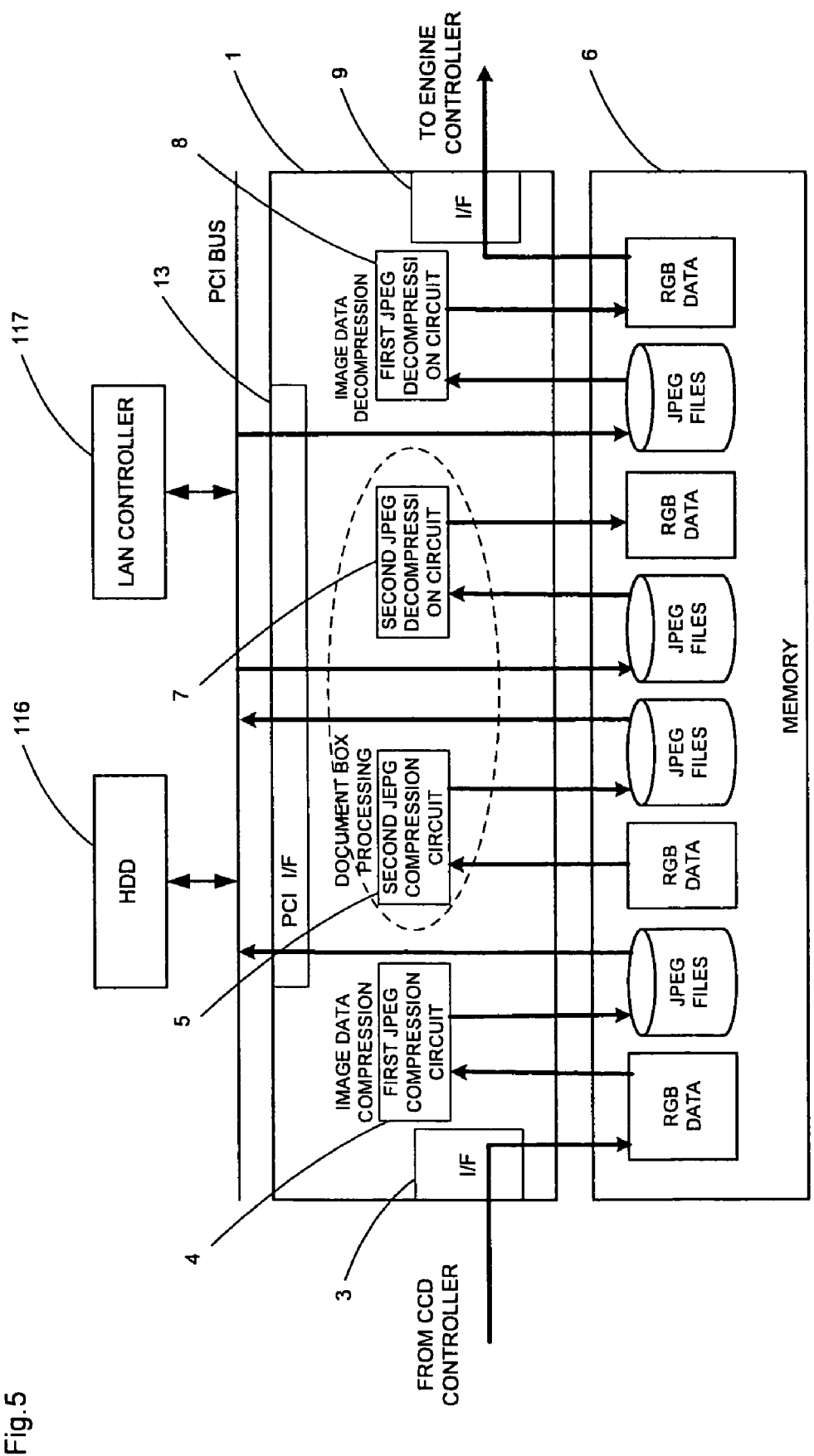
FIG. 5 is an explanation view illustrating the transferring process performed by the memory controller for controlling the image data transfer within the image controller in the image processing apparatus of FIG. 3.

FIG. 5 is an explanation view illustrating transferring processes executed by the memory controller 2 for controlling image data transfers among the first and second JPEG compression circuits 4 and 5, the first and second JPEG decompression circuits 7 and 8 within the image data controller 1, the memory 6 and the HDD 116.

As illustrated in FIG. 5, image data input from the CCD controller 110 to the image data controller 1 is transferred to the memory 6 through the CCD controller I/F 3. Image data from the CCD is pixel-to-pixel-basis data (RGB data) constituted by RGB and thus larger amounts of data are transferred therefrom in comparison with data which has been subjected to JPEG-compression in the subsequent process. In FIG. 5, RGB data as aforementioned and JPEG-compressed data are distinguished from each other by the shapes of pictures, for ease of understanding. The RGB data stored temporally in the memory 6 is transferred to the first JPEG compression circuit 4 and compressed therein, and then stored in the memory 6 as a JPEG file. The JPEG file is stored in the HDD 116 through the PCI I/F 13. In some cases, when RGB data is input from the CCD controller 110, the RGB data may be transferred from the memory 6 to the image processing controller 111 and subjected to image processing therein, then stored in the memory 6 and then the processed RGB data may be subjected to JPEG compression, while in other cases, the image processing may be performed in the latter step. Here, for ease of description, description of the process steps in the image processing controller 111 is omitted. When data compressed and accumulated in the HDD 116 is to be printed, the JPEG file is transferred from the HDD 116 to the memory 6 and then transferred from the memory 6 to the first JPEG decompression circuit 7 where the image data is decompressed, and the RGB data created by the decompression is stored in the memory 6. Then, the RGB data stored in the memory 6 is output from the engine controller I/F 9. There has been described the flow of image data in time sequence. When the MFP operates as a copier, images at the head portion of the document are transferred to the HDD and accumulated therein and, at the same time, are transferred to the decompression circuits and output to the printing section, since if all the document images are accumulated in the HDD and then output, then a long time will be taken from the start of copying to the output of the paper onto which the image has been copied. In this case, the inputting of image data from the CCD controller 110 and the outputting to the engine controller 112 are performed in parallel. Also, in some cases, when plural documents are successively scanned using a document feeding apparatus 1001, a scanned document is printed while the next document is read. In such cases, similarly, the inputting and the outputting of image data are performed in parallel.

In this case, the transferring rate for image data from the CCD is required to be synchronized with the document scanning speed. This is because, if the data inputting process can not follow the document scanning speed, this will cause drop-outs of pixels or lines, thus preventing provision of normal images. Accordingly, the memory 6 is required to have a sufficient memory capacity as a buffer and also the memory controller 2 is required to have a transferring capacity consistent with the transferring rate. Furthermore, this portion transfers RBG data with a large data quantity and therefore an important factor in designing the image data controller 1 is that considerations should be made to enable the transferring capacity of the memory controller 2 to follow the transferring rate for image data from the CCD, as well as the compression rates of the JPEG compression circuits.

Further, the transferring rate for image data to the engine controller is required to be in synchronization with the paper feeding and, if the data outputting process can not follow the paper-feeding speed, this will cause disturbance of printed images thereby preventing outputting of normal images. Outputs to the engine controller are also RGB data and thus an important factor in designing the image data controller 1 is that considerations should be made to enable the transfer capacity of the memory controller 2 to follow the transferring rate for image data to the engine controller, as well as the decompression speeds of the JPEG decompression circuits. Further, in the case where the inputting and outputting are carried out in parallel, the memory controller 2 is required to have a largest processing capacity.

The memory controller 2 included in the image data controller 1 according to the present invention is configured to be capable of performing, in parallel, the process for transferring image data from the CCD controller I/F 3 to the memory 6, then transferring the image data from the memory 6 to the first JPEG compression circuit 4 and then transferring the compressed JPEG file to the HDD 116 and the process for transferring JPEG files from the HDD 116 to the memory 6, transferring them to the first JPEG decompression circuit 7, transferring the RGB data from the first JPEG decompression circuit 7 to the memory 6 and further transferring it from the memory 6 to the engine controller I/F 9. Consequently, it is possible to realize a structure applicable to medium speed machines which outputs image data through the CCD controller I/F 3, the first JPEG compression circuit 4, the PCI I/F 13 (access to the HDD 116), the first JPEG decompression circuit 7 and the engine controller I/F 9.

While in such a structure, the second JPEG compression circuit 5 and the second JPEG decompression circuit 8 are not used for the copier operation, the functions of the MFP include reception and transmission of image data from and to other devices through connections such as networks and USBs. By assigning the second JPEG compression circuit 5 and the second JPEG decompression circuit 8 to such processes for enabling parallel processing, the entire MFP can perform processes more efficiently.

FIG. 5 illustrates, as an aspect, a case where the second JPEG compression circuit 5 and the second JPEG decompression circuit 8 are assigned to the document box processing. Even when the MFP operates as a copier, the user can accumulate, in the HDD 116, print data from an apparatus within the network connected through the LAN controller 117. Also, the user can transfer image data accumulated in the HDD 116 to an apparatus within the network connected through the LAN controller 117.

Third Embodiment

In the present embodiment, there will be described a case where a single compression circuit and a single decompression circuit as described in the second embodiment can not perform processes followable to the inputting and outputting data transferring rates, namely a structure for high-speed machines.

Figure 4:
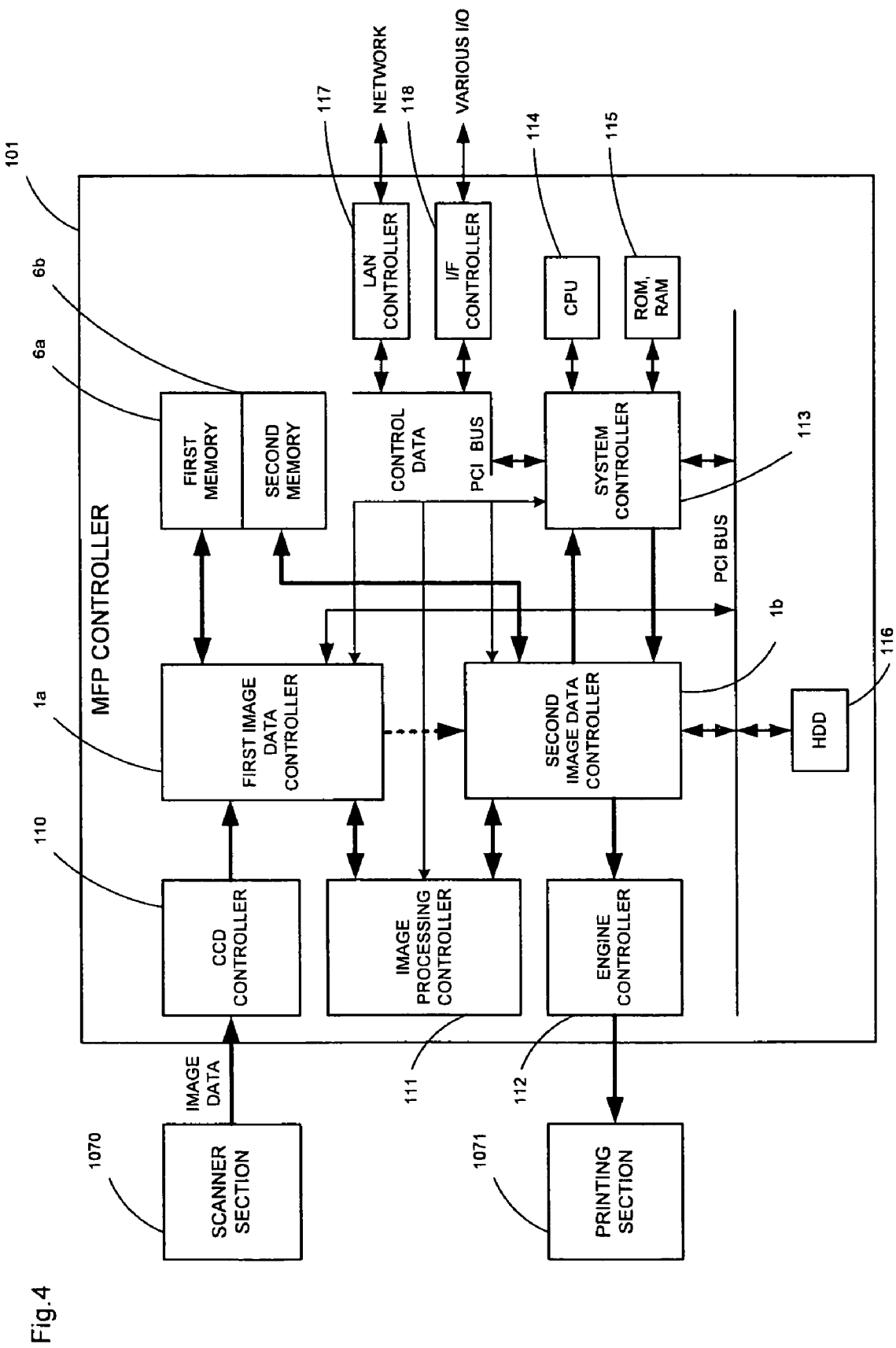
FIG. 4 is a block diagram illustrating an exemplary structure of the MFP controller employing two image data controllers.

As previously described, for high-speed machines, the structure of the image data controller needs to be modified in order to increase the input/output data transferring capacities and the compression/decompression processing speed for providing a required processing capacity. The image data controller according to the present invention includes two compression circuits capable of performing parallel processes and two decompression circuits capable of performing parallel processes, in order to increase the compression/decompression processing speeds. For applications thereof to high-speed machines, these circuits may be connected in parallel to increase the compression processing speed or the decompression processing speed. In other words, the image data controller is configured such that the compression circuits or the decompression circuits having parallel configurations are separated from each other to perform different processes in parallel, for applications to medium-speed machines which do not require critical compression/decompression processing speeds. On the other hand, two image data controllers are employed, in order to increase the data transferring capacity of the memory controller 2 for applications to high-speed machines. Further, one of them is assigned to data transfer at the input side while the other one is assigned to data transferring at the output side. FIG. 4 is a block diagram illustrating an exemplary structure of the MFP controller 101 employing first and second image data controllers 1a, 1b. The first image controller 1a and the second image controller 1b are both the same as that illustrated in FIG. 1. However, image data from the CCD controller 110 is input to the first image controller 1a and the second image controller 1b outputs image data to the engine controller 112. Further, the first image controller 1a receives and transmits image data from and to the image processing controller 111 through the former stage image processing I/F 10 while the second image data controller 1b receives and transmits image data from or to the image processing controller 111 through the latter stage image processing I/F 11. The respective image controllers are connected to memories 6a, 6b. Data transfer between the first and second image data controllers 1a and 1b are performed through the HDD 116 or the image data process controller 111. Also, as illustrated by dot lines in the figure, data transfer therebetween may be performed by connecting the engine controller I/F 9 of the first image controller 1a to the CCD controller I/F 3 of the second image data controller 1b. The respective image controllers can receive and transmit image data from and to the HDD 116 through a PCI bus. Further, the respective image controllers are controlled through controlling data which are received and transmitted from and to the system controller. The other portions have the same structures as those described with FIG. 3.

Figure 6:
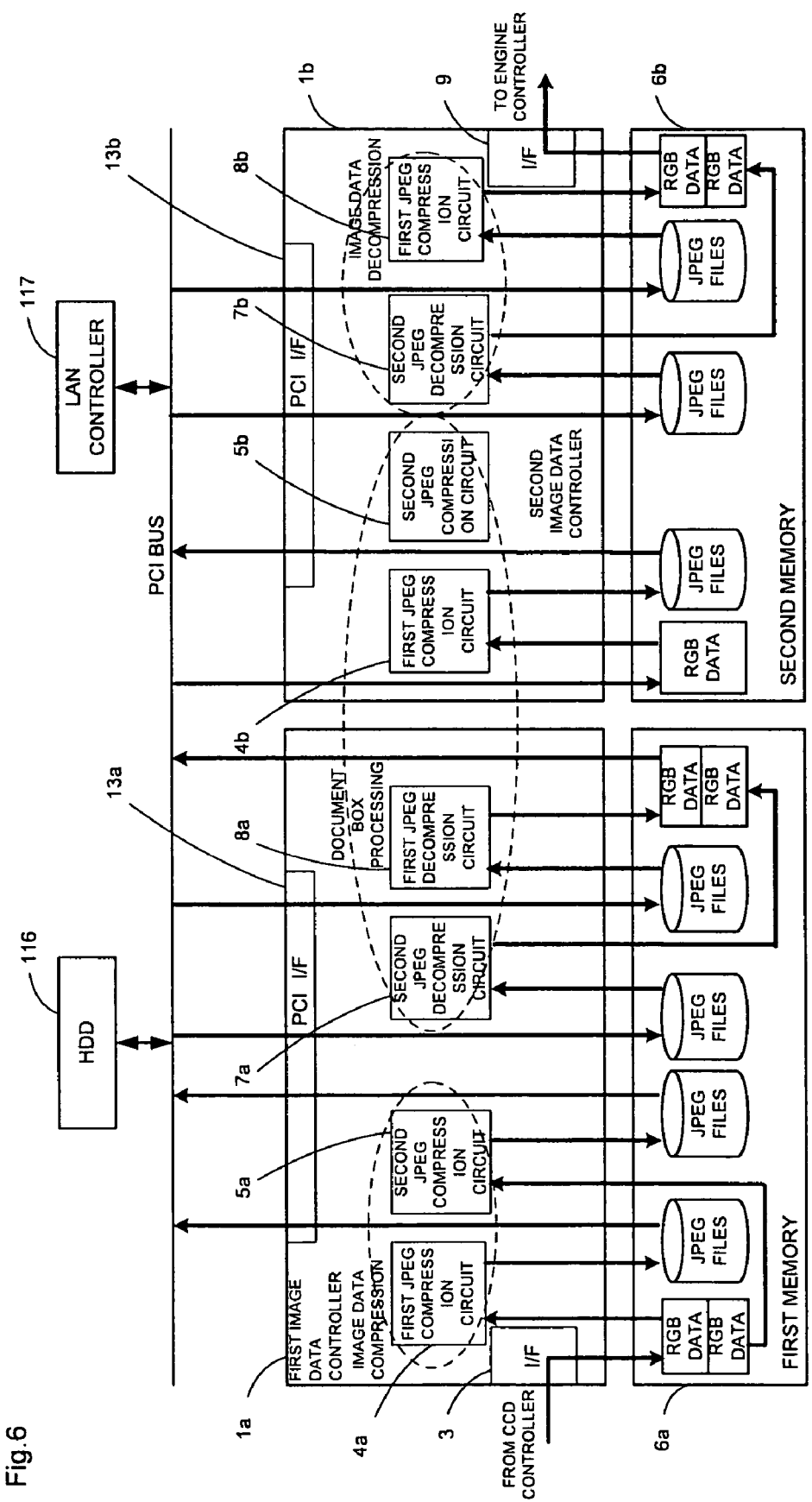
FIG. 6 is an explanation view illustrating the transferring process performed by the memory controllers for controlling the image data transfer in the image processing apparatus of FIG. 4.

FIG. 6 is an explanation view illustrating the transferring process executed by the memory controllers 2a, 2b for controlling image data transfer among the first and second image controllers 1a and 1b, the first and second JPEG compression circuits 4a, 5a, 4b and 5b and the first and second JPEG decompression circuits 7a, 8a, 7b and 8b within the first and second image controllers, the first and second memories 6a and 6b and the HDD 116 which are outside the first and second image controllers. As illustrated in FIG. 6, RGB data input from the CCD controller 110 to the first image data controller 1a is transferred to the first memory 6a through the CCD controller I/F 3a. In FIG. 6, similarly to in FIG. 5, RGB data and JPEG files are distinguished by the shapes of pictures. The RGB data stored temporally in the first memory 6a is transferred in parallel to the first JPEG compression circuit 4a and the second JPEG circuit 5a and compressed in parallel therein and then the respective data is stored in the first memory 6a as JPEG files. These JPEG files are stored in the HDD 116 through the PCI I/F 13. Similarly to in the second embodiment, for ease of description, description of the process steps at the image processing controller 111 is omitted. When the data compressed and accumulated in the HDD 116 is to be printed, the JPEG file is transferred from the HDD 116 to the second memory 6b and then transferred in parallel from the second memory 6b to the first and second JPEG decompression circuits 7b and 8b where the image data are decompressed in parallel, and the RGB data created by the decompression is stored in the second memory 6b. Then, the RGB data stored in the second memory 6b is combined and output from the engine controller I/F 9b. There has been described the flow of image data in time sequence and, when the MFP operates as a copier, inputting and outputting of image data may be performed in parallel.

The memory controller 2a included in the first image data controller 1a according to the present invention is configured to transfer image data from the CCD controller I/F 3a to the first memory 6a, then transfer the image data from the first memory 6a to the first and second JPEG compression circuit 4a and 5b where compression processes are applied thereto in parallel. The memory controller 2b included in the second image data controller 1b transfers JPEG files from the HDD 116 to the second memory 6b, transfers them to the first and second JPEG decompression circuits 7b and 8b where decompression processes are applied thereto in parallel. Further, the memory controller 2b transfers the RGB data created by the decompression from the first and second JPEG decompression circuits 7b and 8b to the second memory 6b, combines the RGB data and transfers it from the second memory 6b to the engine controller I/F 9b. The first and second image data controllers 1a and 1b are configured to perform processes in parallel.

With the aforementioned structure, the data transferring process for transferring image data from the CCD controller 110 to the compression circuits is performed between the first image data controller 1a and the first memory 6a, while the data transferring process for transferring image data from the decompression circuits to the engine controller 112 is performed between the second-image controller 1b and the second memory 6b, and therefore the respective data transfers utilize the respective dedicated memory controllers and memories, thus avoiding overlaps of the data transferring paths. This enables higher-speed data transfers in comparison with structures applicable to medium-speed machines which employ a common memory controller and a common memory for input and output data transfers. Further, image data can be compression-processed in parallel in the first and second JPEG compression circuits 4a and 5a of the first image data controller and image data can be decompression-processed in parallel in the first and second JPEG decompression circuits 7b and 8b of the second image data controller, thereby enabling higher-speed data compression/decompression processes in comparison with structures applicable for medium-speed machine which employ a single compression circuit and a single decompression circuit.

Consequently, when a single image data controller can not offer inputting/outputting data transferring speeds or image data compression and decompression processing speeds followable to the inputting/outputting speeds, the processing speeds can be increased by using the two image data controllers.

In this structure, the first and second JPEG decompression circuits 7a and 8a of the first image data controller 1a and the first and second JPEG compression circuits 4b and 5b of the second image data controller 1b are not used for the copier operation. As previously described, the functions of the MFP include reception and transmission of image data from and to other devices through connections such as networks and USBs. By assigning the JPEG compression circuits and the JPEG decompression circuits which are not used for the copier operation to such processes for enabling parallel processing, the entire MFP can perform processes more efficiently.

FIG. 6 illustrates, as an aspect, a case where the first and second JPEG decompression circuits 7a and 8a of the first image data controller 1a and the first and second JPEG compression circuits 4b and 5b of the second image data controller 1b are assigned to the document box processing. Even when the MFP operates as a copier, the user can accumulate, in the HDD 116, print data from an apparatus within the network connected through the LAN controller 117. Also, the user can transfer image data accumulated in the HDD 116 to an apparatus within the network connected through the LAN controller 117.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image data processing circuit comprising:

an input section for inputting image data of a plurality of pages of an original document on a page by page basis to produce input image data;

a first compressing section and a second compressing section which are capable of compressing the input image data, to produce compressed input image data in a manner which is processed solely or in parallel;

a first decompressing section and a second decompressing section which are capable of decompressing the compressed input image data, to produce decompressed input image data in a manner which is processed solely or in parallel;

an output section for outputting the decompressed input image data to print each page based on the decompressed input image data;

a transferring section for transferring i) the input image data from the input section to a memory and then from the memory to the first and/or second compressing section, ii) the compressed input image data from the first and/or second compressing section to the memory and then from the memory to the first and/or second decompressing section, and iii) the decompressed input image data from the first and/or second decompressing section to the memory and then from the memory to the output section; and a transfer controlling section for controlling the transferring section selectively, so that the transferring section operates in a parallel input/output mode, a parallel input mode or a parallel output mode wherein;

the parallel input/output mode is a selective mode in which the transferring section transfers the compressed input image data of a preceding page or preceding pages from the memory to the first decompressing section and the decompressed input image data to the memory and then to the output section to print the preceding page or the preceding pages at a predetermined output speed while transferring the input image data of a following page or pages from the input section to the memory and then to the first compressing section and the compressed input image data to the memory to input the input image data of each page at a predetermined input speed;

the parallel input mode is a mode in which the transferring section transfers each page of the input image data from the input section to the memory and then transfers a part of the input image data of each page to the first compressing section while transferring another part of the input image data to the second compressing section to input the input image data of each page at a predetermined input speed, and the parallel output mode is a mode in which the transferring section transfers a part of the compressed input image data of each page from the memory to the first decompressing section while transferring another part of the compressed input image data from the memory to the second decompressing section, and then transfers the decompressed input image data from the first and second decompressed sections to the memory and then to the output section to print each page at a predetermined output speed.

* * * * *